US009602215B2

(12) United States Patent
Joy et al.

(10) Patent No.: US 9,602,215 B2
(45) Date of Patent: Mar. 21, 2017

(54) DYNAMIC FARE COLLECTION DATA PROBE

(71) Applicant: SPX CORPORATION, Charlotte, NC (US)

(72) Inventors: Bruce R. Joy, Elk Grove Village, IL (US); Sasa Vukovic, Elk Grove Village, IL (US)

(73) Assignee: SPX CORPORATION, Charlotte, NC (US)

( * ) Notice: Subject to any disclaimer, the term of this patent is extended or adjusted under 35 U.S.C. 154(b) by 0 days.

(21) Appl. No.: 14/685,026

(22) Filed: Apr. 13, 2015

(65) Prior Publication Data

US 2016/0301476 A1 Oct. 13, 2016

(51) Int. Cl.
*H04B 10/00* (2013.01)
*H04B 10/50* (2013.01)
*G07B 15/00* (2011.01)
*H04B 10/67* (2013.01)

(52) U.S. Cl.
CPC ............ *H04B 10/50* (2013.01); *G07B 15/00* (2013.01); *H04B 10/67* (2013.01)

(58) Field of Classification Search
CPC ........ H04B 10/50; H04B 10/67; H04B 10/40; H04B 10/43; G07B 15/00
USPC .......................................................... 398/140
See application file for complete search history.

(56) References Cited

U.S. PATENT DOCUMENTS

| 2006/0051102 A1* | 3/2006 | Lee ........................ | H04B 10/40 398/164 |
| 2009/0248526 A1* | 10/2009 | Park ...................... | G06Q 20/10 705/14.15 |
| 2016/0019726 A1 | 1/2016 | Joy et al. | |

* cited by examiner

*Primary Examiner* — M. R. Sedighian
(74) *Attorney, Agent, or Firm* — Baker Hostetler LLP

(57) ABSTRACT

The invention provides a device, system, and method for receiving and transmitting fare collection data with a dynamic fare collection data probe. Specifically, the dynamic fare collection data probe automatically adjusts gain to allow for faster data rates and compensate for variances within emitter and detector parameters associated with a fare collection system.

16 Claims, 14 Drawing Sheets

Cont. 2

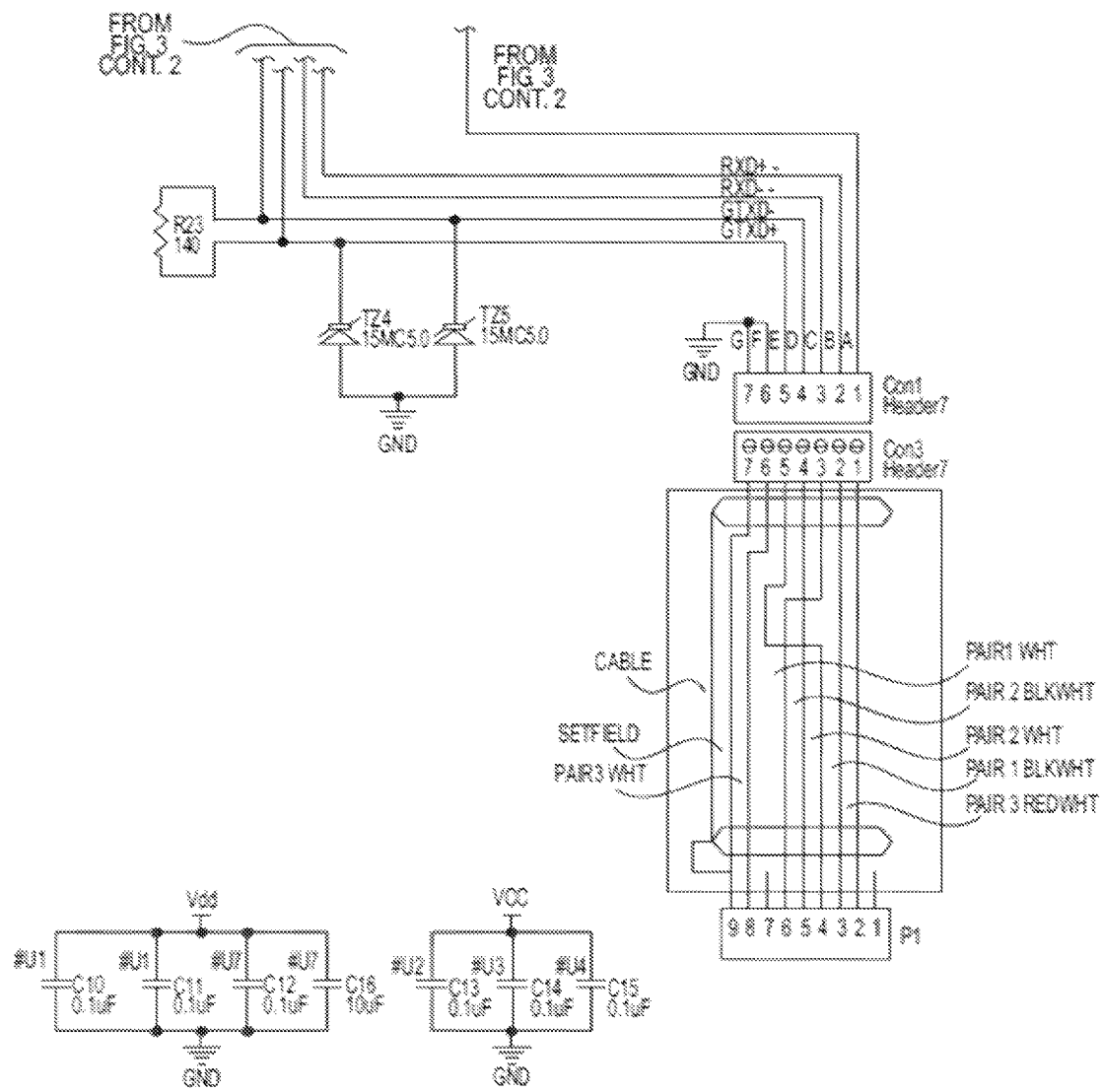
FIG. 3
Cont. 3
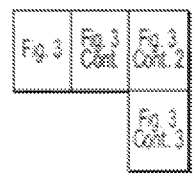

DYNAMIC FARE COLLECTION DATA PROBE

BACKGROUND OF THE DISCLOSURE

1. Field of the Disclosure

The disclosure generally relates to a device, system, and method for receiving and transmitting fare collection data with a dynamic fare collection data probe. Specifically, the disclosure relates to a dynamic fare collection data probe that allows for faster data rates and compensates for variances within emitter and detector parameters associated with a fare collection system.

2. Related Art

In conventional designs, a fare box receives passenger fares for public transportation such as a bus, subway, light rail, train, or the like. Fare boxes can have a place to input bills and change, readers for smart cards that transmit payments, readers for near field code-enabled devices, magnetic card readers, and the like.

Fare collection equipment can employ a contactless method of data transfer. A user holds a data probe up to a window (known as a data port) on the fare collection device and transfers data in both directions through infrared light. The directions represent the data system both transmitting from and receiving on the data probe.

Such a method may often utilize fixed intensity infrared emitters and fixed gain infrared detectors to transfer data. The drawback of using fixed intensity emitters and fixed gain detectors is that as the data rates increase, the detector becomes effectively blinded by the emitter. In addition, gains for infrared photo detector devices vary significantly from device to device, thus limiting the overall data transfer rate.

Accordingly, there is a need for a system and a method for automatically adjusting gain in a dynamic data probe for a fare collection system to allow for faster data rates and compensate for variances within emitter and detector parameters.

SUMMARY OF THE INVENTION

The foregoing needs are met, to a great extent, by the invention, with a device, system, and method for automatically adjusting gain to allow for faster data rates and compensate for variances within emitter and detector parameters. Some users may benefit from such a device, system, and method by experiencing an optimized transfer of fare collection data. Other users may benefit from experiencing reduced errors in the transfer of fare data. Still other users may benefit from more efficient transfers a fare data when transfer parameters change.

In one or more aspects, a system for optimizing data transfer on a dynamic fare collection data probe, includes a transmitter configured to transmit data on the dynamic fare collection data probe, a receiver configured to receive data on the dynamic fare collection data probe, a transmitter gain option configured to control an intensity level of the transmitter, a receiver gain option configured to control an intensity level of the receiver, and a processor configured to select the transmitter gain option and receiver gain option.

In one or more aspects, a method for optimizing data transfer on a dynamic fare collection data probe, includes determining at least one of the following: an optimal transmitter gain option and an optimal receiver gain option, selecting, upon determining at least one of the optimal transmitter gain option and the optimal receiver gain option, at least one of the optimal receiver gain option and the optimal transmitter gain option, transmitting data from the dynamic fare collection data probe with an infrared emitter, wherein transmitting data from the dynamic fare collection data probe comprises using the selected optimal transmitter gain option to control the transmission of data, receiving data on the dynamic fare collection data probe with an infrared detector, wherein receiving data on the dynamic fare collection data probe comprises using the selected optimal receiver gain option to control the reception of data, and monitoring fare collection data inputs on the dynamic fare collection data probe in response to transmitting data from the dynamic fare collection data probe and receiving data on the dynamic fare collection data probe.

In one or more aspects, a dynamic fare collection data probe device, includes a transmitter configured to transmit data on the dynamic fare collection data probe, a receiver configured to receive data on the dynamic fare collection data probe, a transmitter gain option configured to control an intensity level of the transmitter, a receiver gain option configured to control an intensity level of the receiver, and a processor configured to select the transmitter gain option and receiver gain option.

There has thus been outlined, rather broadly, certain aspects of the invention in order that the detailed description thereof herein may be better understood and in order that the present contribution to the art may be better appreciated. There are, of course, additional aspects of the invention that will be described below and which will form the subject matter of the claims appended hereto.

In this respect, before explaining at least one aspect of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the invention. It is important, therefore, that the claims be regarded as including such equivalent constructions insofar as they do not depart from the spirit and scope of the invention.

DETAILED DESCRIPTION

Figure 1:
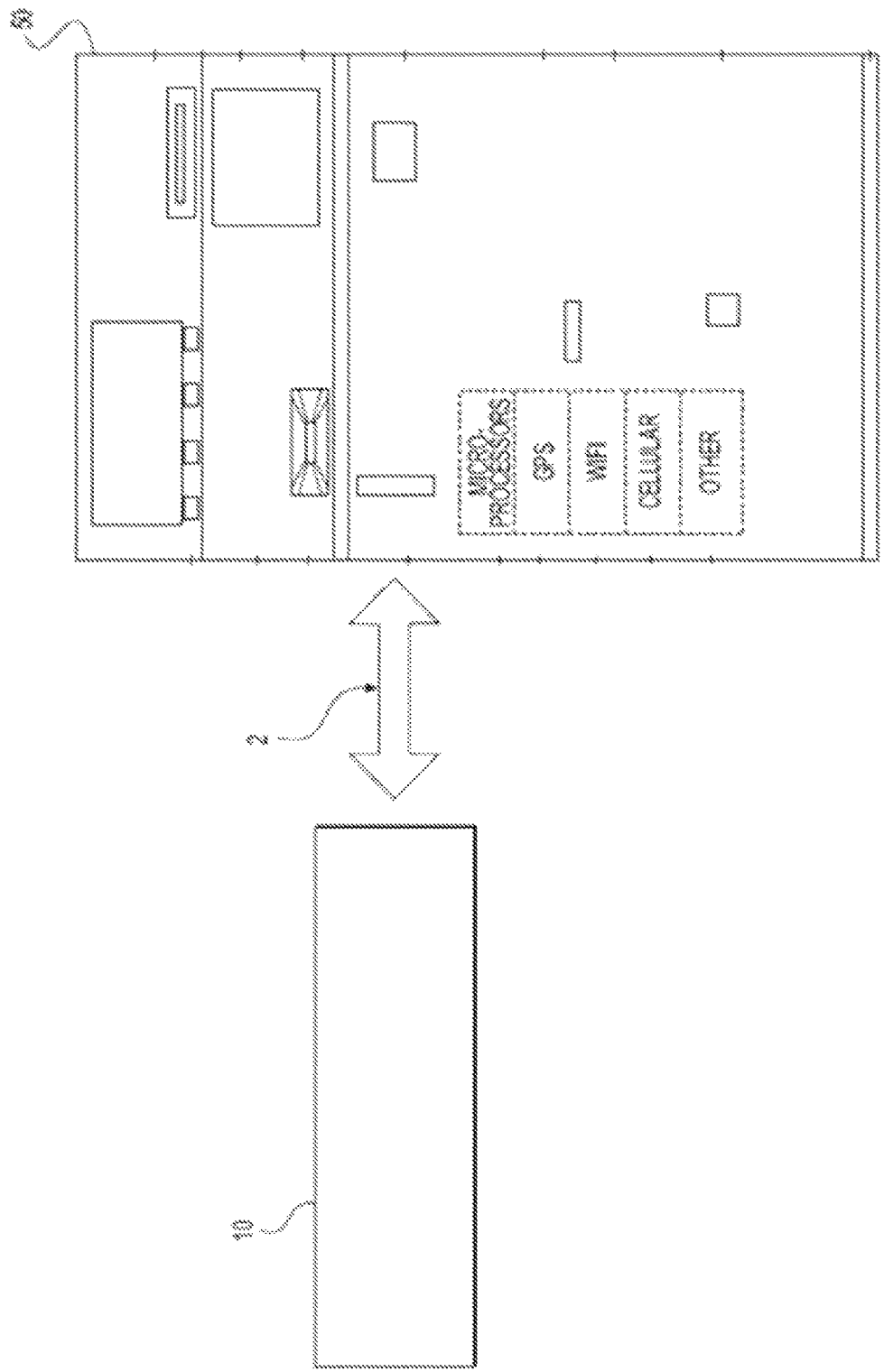
FIG. 1 shows the dynamic fare collection data probe along with a typical fare box with which the data probe will connect to transmit fare data according to one aspect of the disclosure.

The invention will now be described with reference to the drawing figures, in which like reference numerals refer to like parts throughout. Aspects of the invention advantageously provide a device, system, and method for adjusting parameters, such as gain, on a data probe to allow for faster data rates and compensate for variances within emitter and detector parameters associated with a fare collection system.

As may be appreciated by those skilled in the art, the illustrated structure is a logical structure and not a physical one. Accordingly, the illustrated modules can be implemented by employing various hardware and software components. In addition, two or more of the logical components can be implemented as a single module that provides functionality for both components.

FIG. 1 shows the dynamic fare collection data probe 10 along with a typical fare box 50 with which the dynamic fare collection data probe 10 will connect to transmit fare data. The dynamic fare collection data probe 10 connects to a fare box 50 to transmit or receive fare data over a communication channel 2, such as an infrared receiver. The fare box 50 may be located on a bus, subway, light rail, train, or other transportation means and may be configured to receive fares in the form of cash, coins, or electronic fund transfers through fare cards and the like. Fare data may include data on fares collected, schedules, routes, fare rates, firmware updates, software updates, and the like. The fare box 50 may be the "Fare Collecting Apparatus and Method Having Wireless Communication Ability," having application No. 62/025,320, filed Jul. 16, 2014, and incorporated by reference in its entirety.

Figure 2:
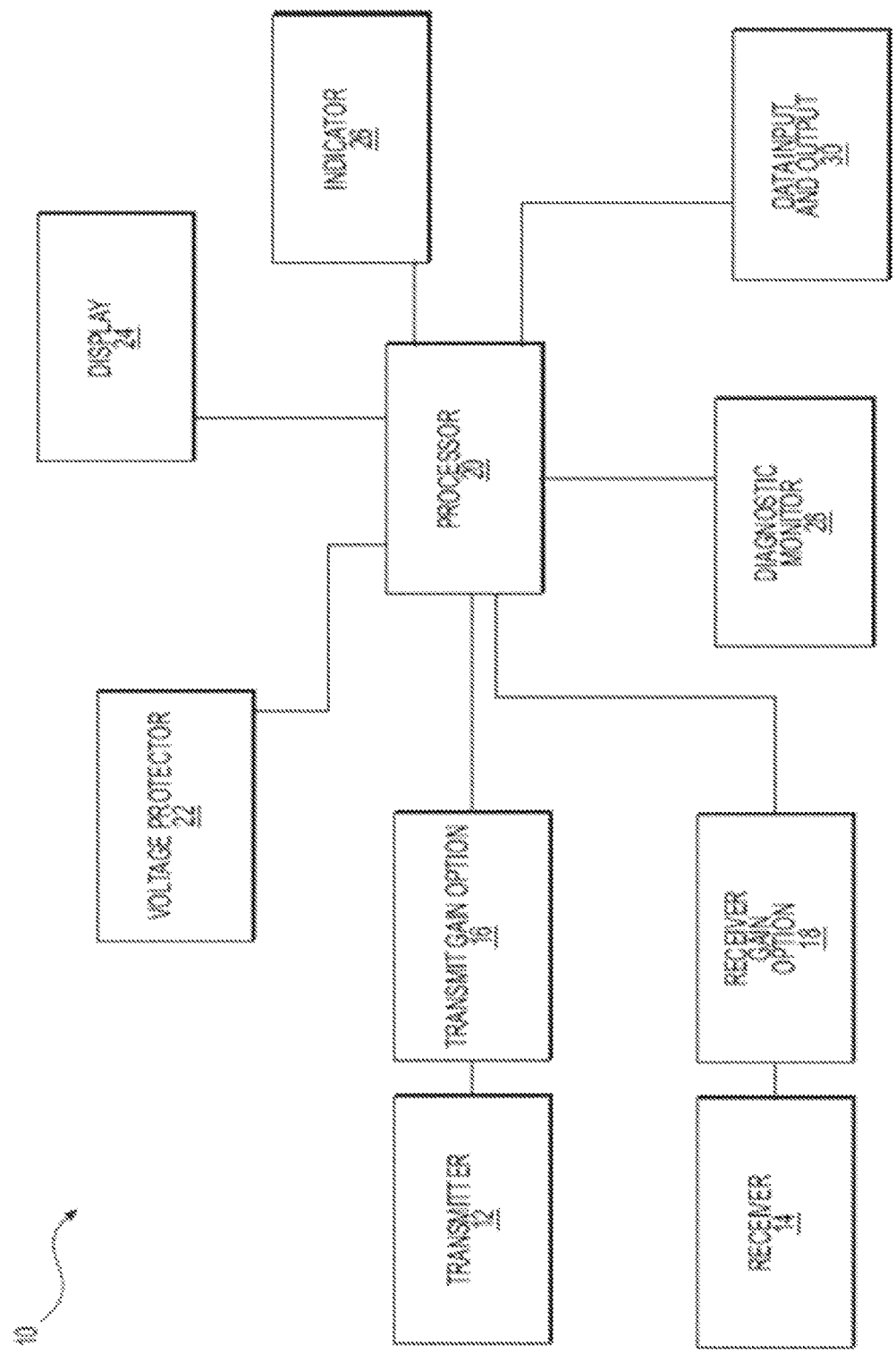
FIG. 2 shows the components of the dynamic fare collection data probe according to one aspect of the disclosure.

FIG. 2 shows the dynamic fare collection data probe 10, which may include a transmitter 12, a receiver 14, a transmitter gain option 16, a receiver gain option 18, a processor 20, a voltage protector 22, a display 24, an indicator 26, a diagnostic monitor 28, a data input or output 30, and the like. The data input or output 30 provides data being received or transmitted by the dynamic data probe. The transmitter 12 transmits data from the dynamic fare collection data probe 10 on a communication channel 2. The receiver 14 receives data for the dynamic data probe 10 on a communication channel 2. The transmitting or receiving of data on the dynamic fare collection data probe 10 can be performed in connection with the fare box 50 or similar fare collection means on a transportation service. The transmitter 12 and receiver 14 can operate on separate transceivers or on the same transceiver.

In one aspect of the invention, the processor 20 provides data to the transmitter 12 to transmit to the fare box 50. The processor 20 is configured to select a transmitter gain option 16 for the data transmission. The selection of the transmitter gain option 16 optimizes the outgoing data stream. The transmitter gain option 16 can be controlled through an operational amplifier. The indicator 26 may show that the dynamic fare collection data probe 10 is in transmission mode. The indicator 26 can be a light emitting diode or the like, and can be of multiple colors. The indicator 26 can also be multiple light emitting diodes. The data sent from the transmitter 12 may be provided by the data output 30. The processor 20 may continue to select a transmitter gain option 16 to optimize data transmission.

In another aspect of the invention, the receiver 14 receives fare data from the fare box 50, and the data input 30 may be communicated through the processor 20. The processor 20 is configured to select a receiver gain option 18 for the data transmission. The selection of a receiver gain option 18 optimizes receipt of the incoming data stream. The receiver gain option 18 can be a series of resisters from which the processor 20 may select to optimize the incoming data stream. The indicator 26 may show that the dynamic fare collection data probe 10 is in receiver mode. The indicator 26 can be a light emitting diode or the like, and can be of multiple colors. The indicator 26 can also be multiple light emitting diodes. The processor 20 may continue to select a receiver gain option 18 to optimize data transmission.

In another aspect of the invention, a voltage protector 22 can ensure surge protection on the dynamic fare collection data probe 10. The voltage protector 22 can decouple the dynamic fare collection data probe 10 from a connected device such as the fare box 50 or other system device to prevent damage to the dynamic fare collection data probe 10.

In another aspect of the invention, a display 24 can show data relevant to the transfer of fare data to and from the dynamic data probe. The data that the display 24 may show includes baud rates, direction of data flow, diagnostic information, and the like. The display may be a cathode ray tube (CRT), a light-emitting diode display (LED), an electroluminescent display (ELD), a plasma display panel (PDP), a liquid crystal display (LCD), an organic light-emitting diode display (OLED), or any other display technology.

In another aspect of the invention, a diagnostic monitor 28 can monitor input data, regulate voltage for various system components, and execute diagnostic processes on the dynamic fare collection data probe 10. The display 24 can show diagnostic information for the dynamic fare collection data probe.

In another aspect of the invention, the transmitter gain option 16 and receiver gain option 18 can be adjusted by pulse modulation. In such an aspect, instead of selecting a combination of resistors, voltage can be varied with various electronic components to adjust the gain for transmitting or receiving data. Such pulse modulation can be executed using a Schmitt Trigger, an integrator, and a comparator, or the like.

FIG. 2 further shows the components of the dynamic fare collection data probe 10. The transmitter 12 uses a transmitter gain option 16 selected by the processor 20 for data optimization. The receiver 14 may use a receiver gain option 18 selected by the processor 20 for data transmission optimization. The processor 20 can process data input or output 30. The indicator 26 may show whether the dynamic fare collection data probe 10 is in transmit or receive mode. The voltage protector 22 may prevent power surges on the dynamic fare collection data probe 10. The diagnostic monitor 28 may monitor input data, regulate voltage for various system components, and execute diagnostic processes on the dynamic fare collection data probe 10. The display 24 can display the mode, rate of data transfer, and other related information provided by the processor 20.

Figure 3:
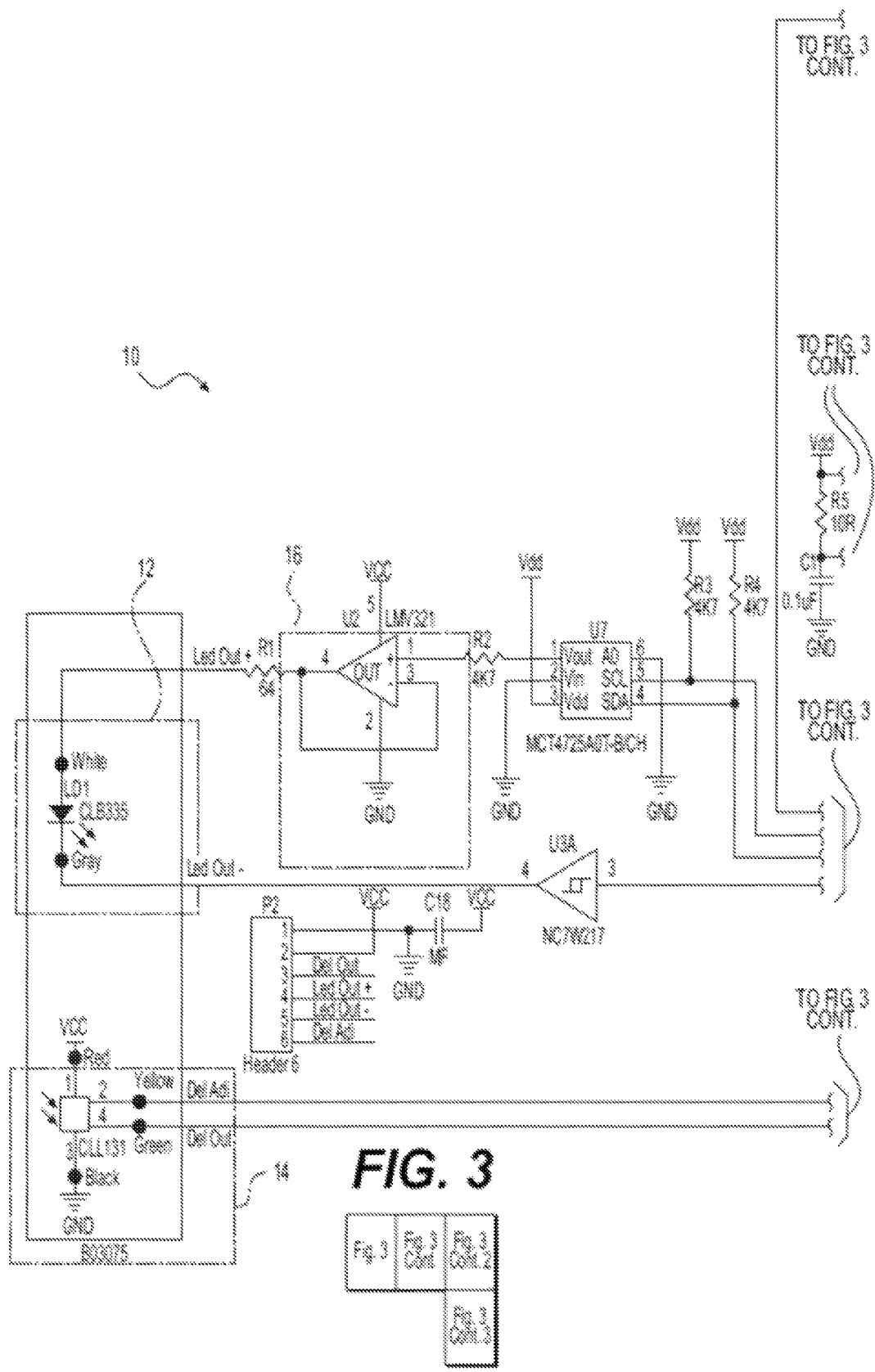
FIG. 3 shows a schematic of an aspect of the dynamic fare collection data probe according to one aspect of the disclosure.
Figure 3:
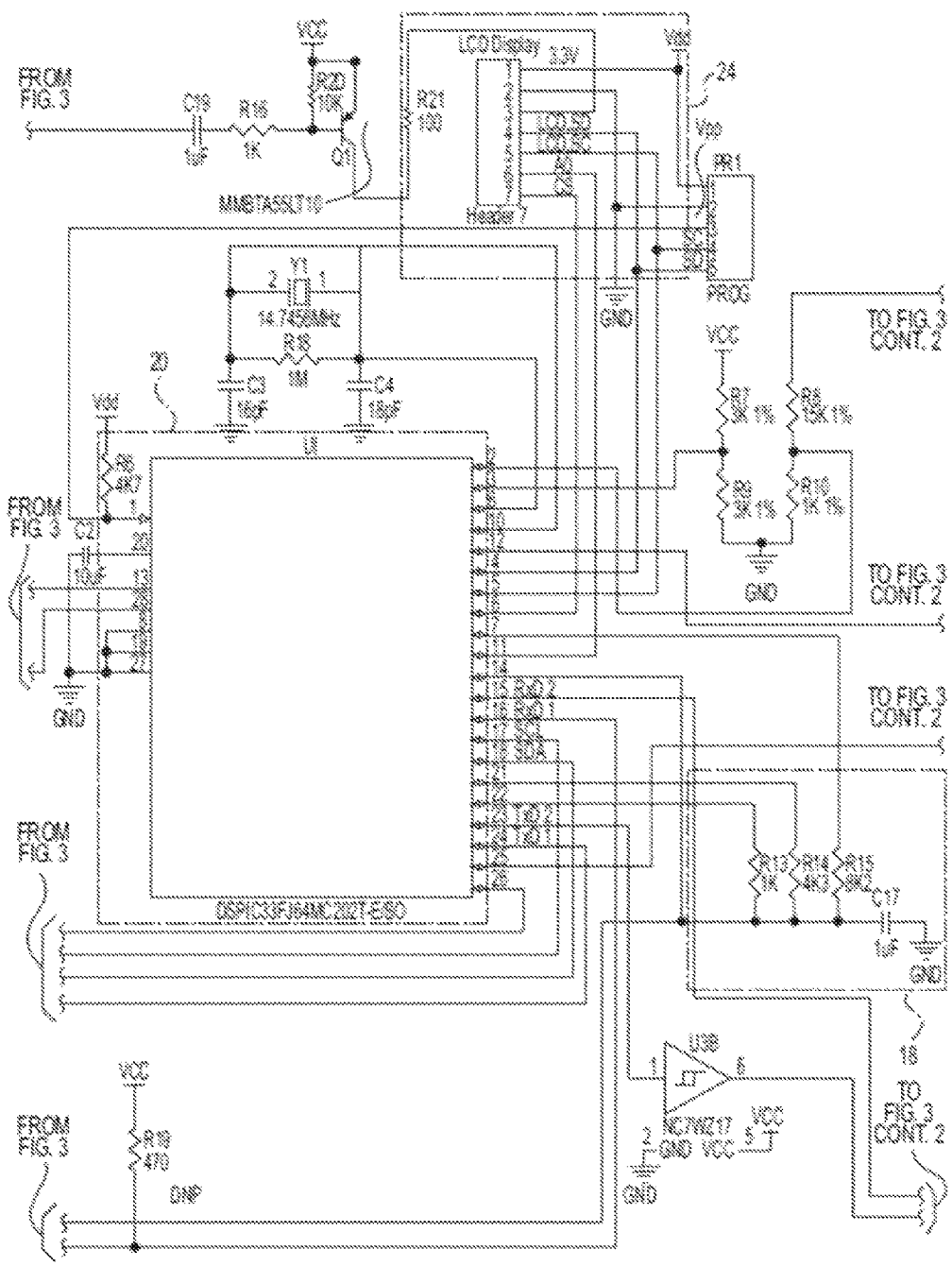
Figure 3:
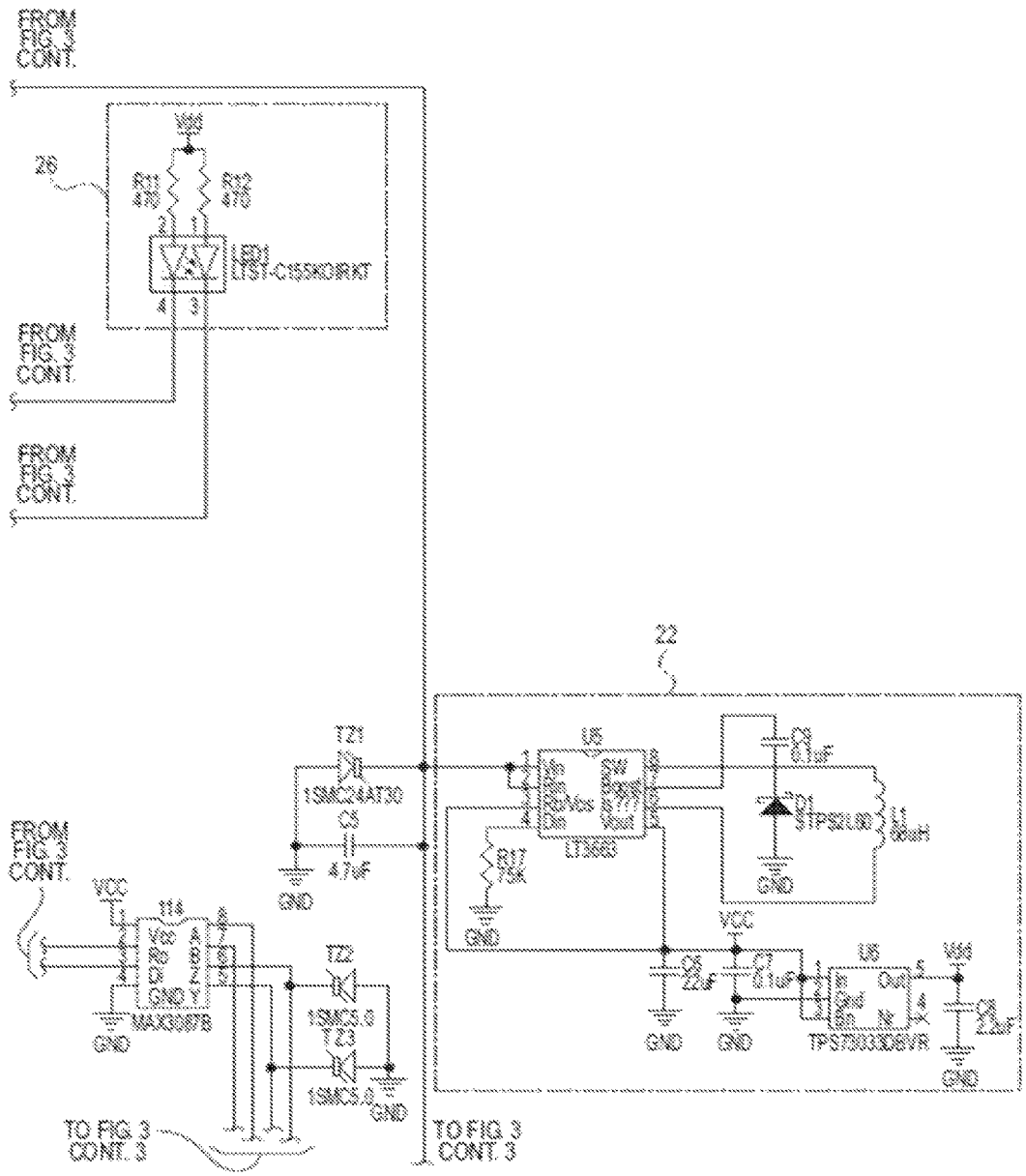

FIG. 3 shows a schematic of an aspect of the dynamic fare collection data probe 10. The processor 20 may select the transmitter gain option 16 with an operational amplifier. The transmitter gain option 16 may include an operational amplifier and resistors arranged to provide a signal to the transmitter 12. The operational amplifier may be arranged in configuration with a digital-to-analog converter to convert signals from the processor 20. The transmitter gain option 16 may be adjusted by pulse modulation. In such an aspect, voltage can be varied with various electronic components to adjust the gain for transmitting or receiving data. Such pulse modulation can be executed using a Schmitt Trigger, an integrator, a comparator, and the like.

The receiver gain option 18 may include a plurality of resistors or a variable resistor. The processor 20 may select a resistor from the plurality of resistors in the receiver gain option 18 in order to allow for faster data rates and compensate for variances within emitter and detector parameters. The receiver gain option 18 may be adjusted by pulse modulation. In such an aspect, voltage can be varied with various electronic components to adjust the gain for transmitting or receiving data. Such pulse modulation can be executed using a Schmitt Trigger, an integrator, and a comparator, or the like.

The indicator 26 may show that the dynamic fare collection data probe 10 is in transmission or receiving mode. The indicator 26 may be a light emitting diode or a plurality of light emitting diodes, a neon light, a filament lamp, or the like. The indicator 26 can be one color so that if on it represents a particular mode for the dynamic fare collection data probe 10, or may be multiple colors to represent each mode.

The voltage protector 22 may prevent power surges. The voltage protector 22 may be a low-dropout low-power linear voltage regulator or the like. The voltage protector 22 may be used in combination with a step-down switching regulator or the like to control power dissipation.

The display 24 may display data transmission and diagnostic information. The display may be a cathode ray tube (CRT), a light-emitting diode display (LED), an electroluminescent display (ELD), a plasma display pan& (PDP), a liquid crystal display (LCD), an organic light-emitting diode display (OLED), or any other display technology. The display 24 may display information such as the data transmission mode, system health, software status, rate of data transfer, and the like.

Figure 4:
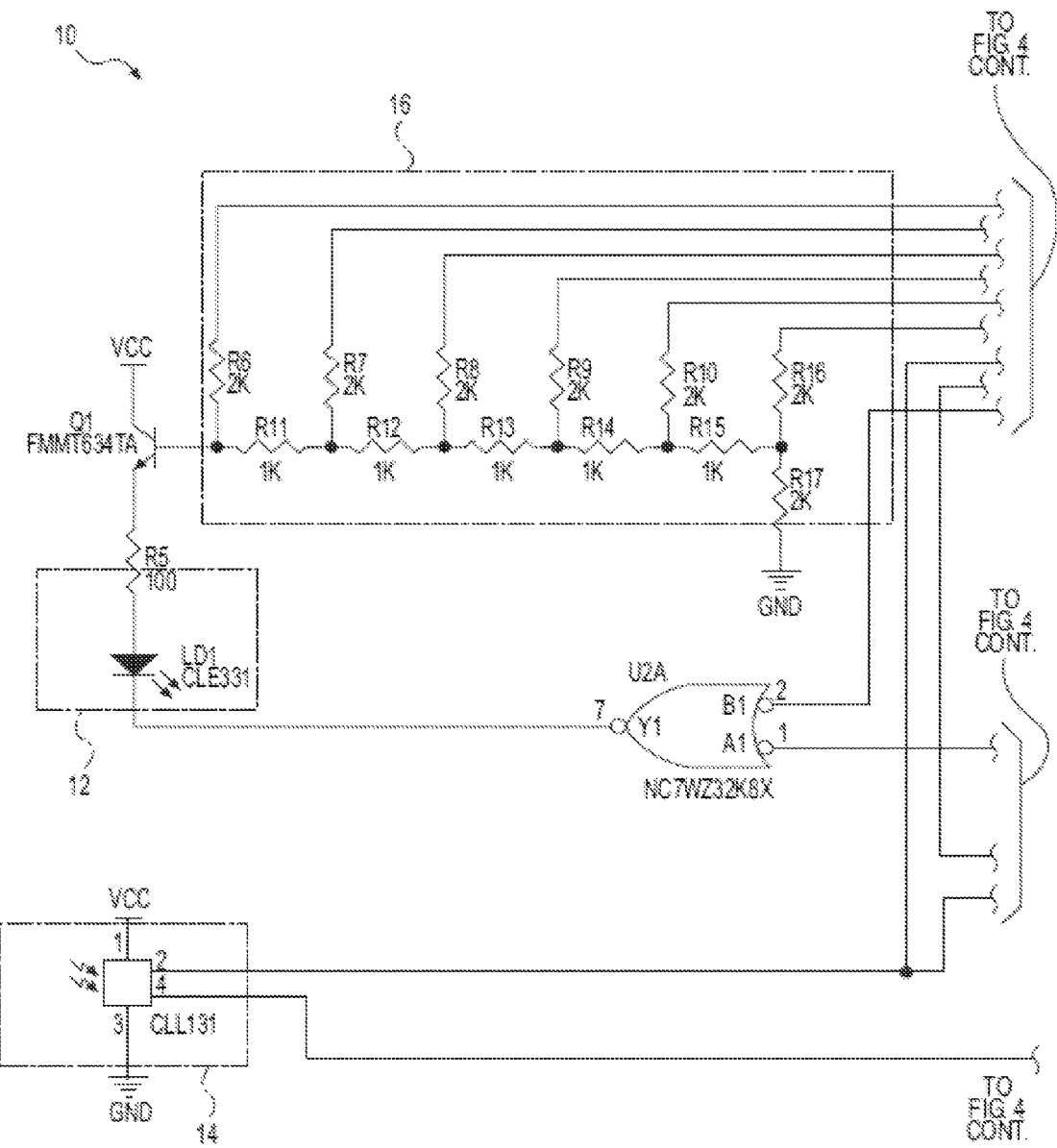
FIG. 4 shows a schematic of the dynamic fare collection data probe with the transmitter, receiver, and data input and output according to another aspect of the disclosure.
Figure 4:
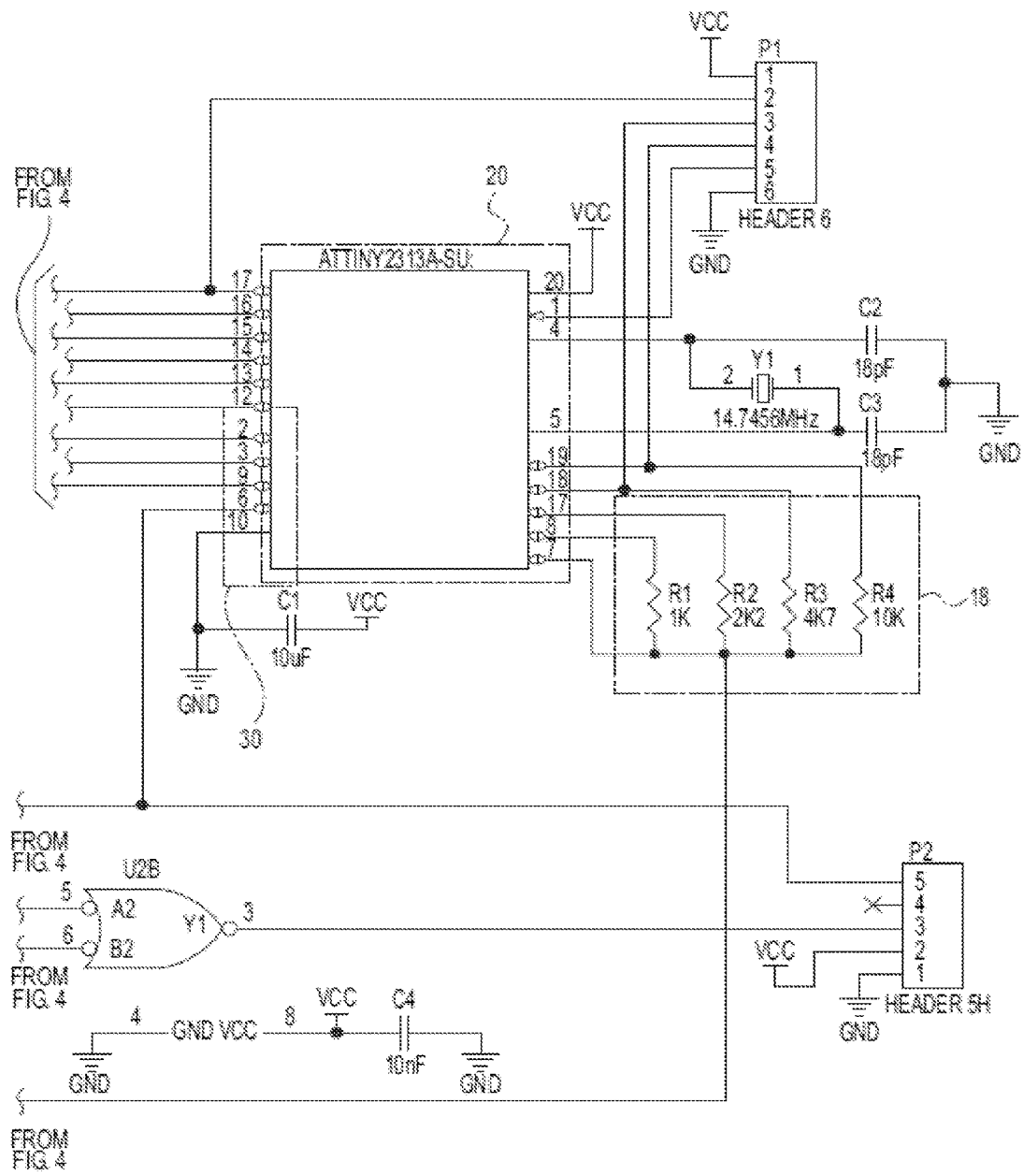

FIG. 4 shows a schematic of the dynamic data probe 10 with the transmitter 12, receiver 14, and data input and output 30. The data input and output 30 correspond to the data received by the receiver 14 and the data to be transmitted by the transmitter 12. The data input and output 30 may correspond to one or multiple input and output pins in a processor 20. The data output 30 provides the data output by the transmitter 12 or the data input 30 provided by the receiver 14. The data input and output 30 can include the date on fares collected, schedules, routes, fare rates, firmware updates, software updates, and the like.

The processor 20 may select the transmitter gain option 16 by selecting one of a plurality of resistors or a variable resistor. The plurality of resistors or variable resistor may be arranged in combination with a transistor to create the transmitter gain option 16. The selection of a resistor from a plurality of resistors in the transmitter gain option 16 determines a current provided to the transistor based on the resistance of the resistor selected by the processor 20. Current travels to the transistor based on the selection of a resistor in the transmitter gain option 16 and creates a proportional gain through the transistor, and that gain is used for the transmitter 12.

The processor 20 may also select the receiver gain option 18 by selecting one of a plurality of resistors or a variable resistor. Different resistor values may result in different current, therefore leading to different gain values for the receiver 14. One gain value may be selected and received by the processor 20 based on the processor's 20 selection of a resistor in the receiver gain option 18.

Figure 5:
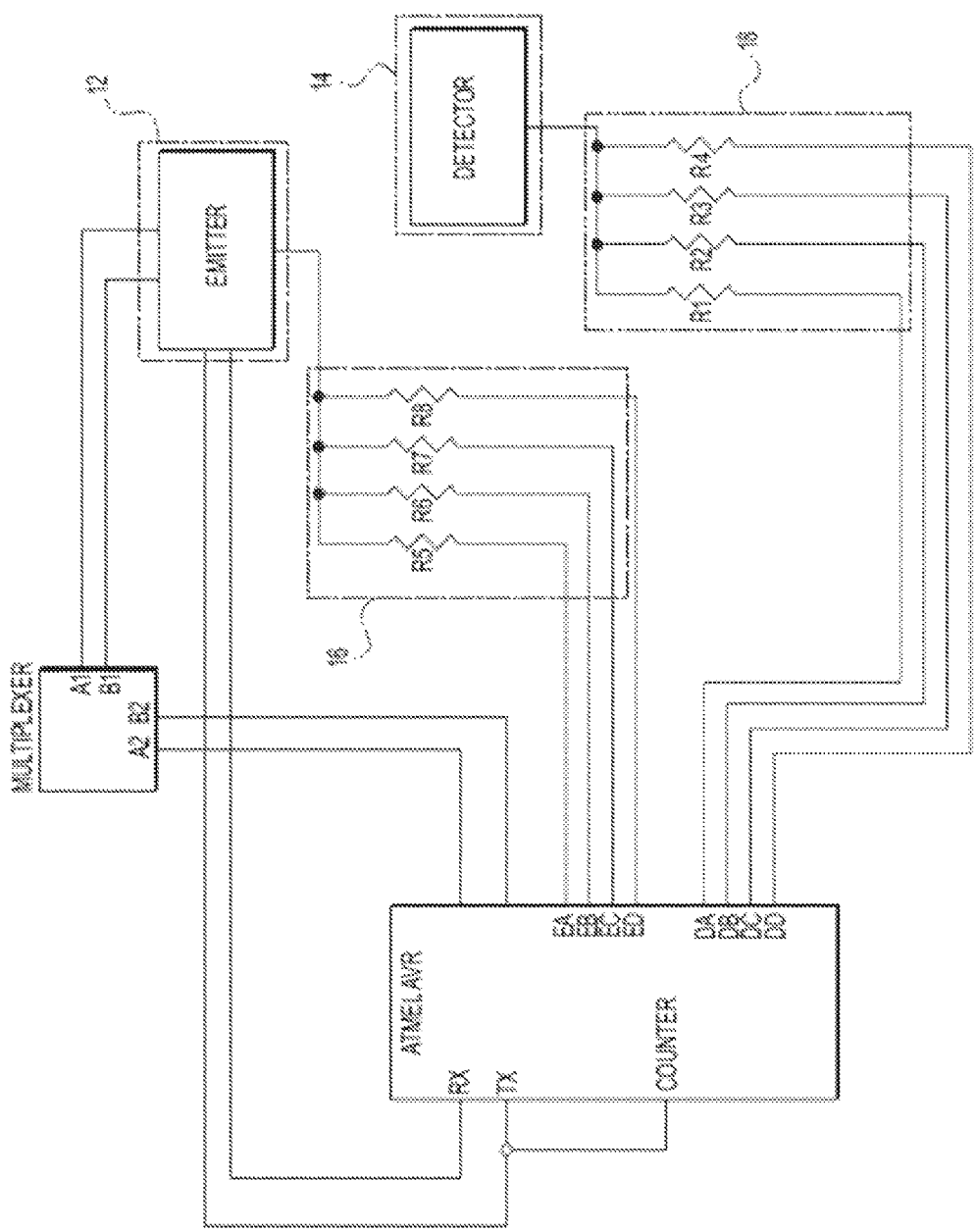
FIG. 5 shows the transmitter gain option and the receiver gain option for the transmitter and receiver, respectively, on the dynamic fare collection data probe according to yet another aspect of the disclosure.

FIG. 5 shows the transmitter gain option 16 and the receiver gain option 18 for the transmitter 12 and receiver 14, respectively. The transmitter 12 can be an infrared emitter with an intensity level that can be adjusted by the transmitter gain option 16. The receiver 14 can be an infrared detector with a sensitivity level that can be adjusted by the receiver gain option 16.

As explained above, the selection of a resistor from a plurality of resistors in the transmitter gain option 16 corresponds to a transmitter gain option 16 that can be used for the transmitter 12. Likewise, the selection of a resistor from a plurality of resistors in the receiver gain option 18 corresponds to a gain that can be used for the data received by the receiver 14.

Figure 6:
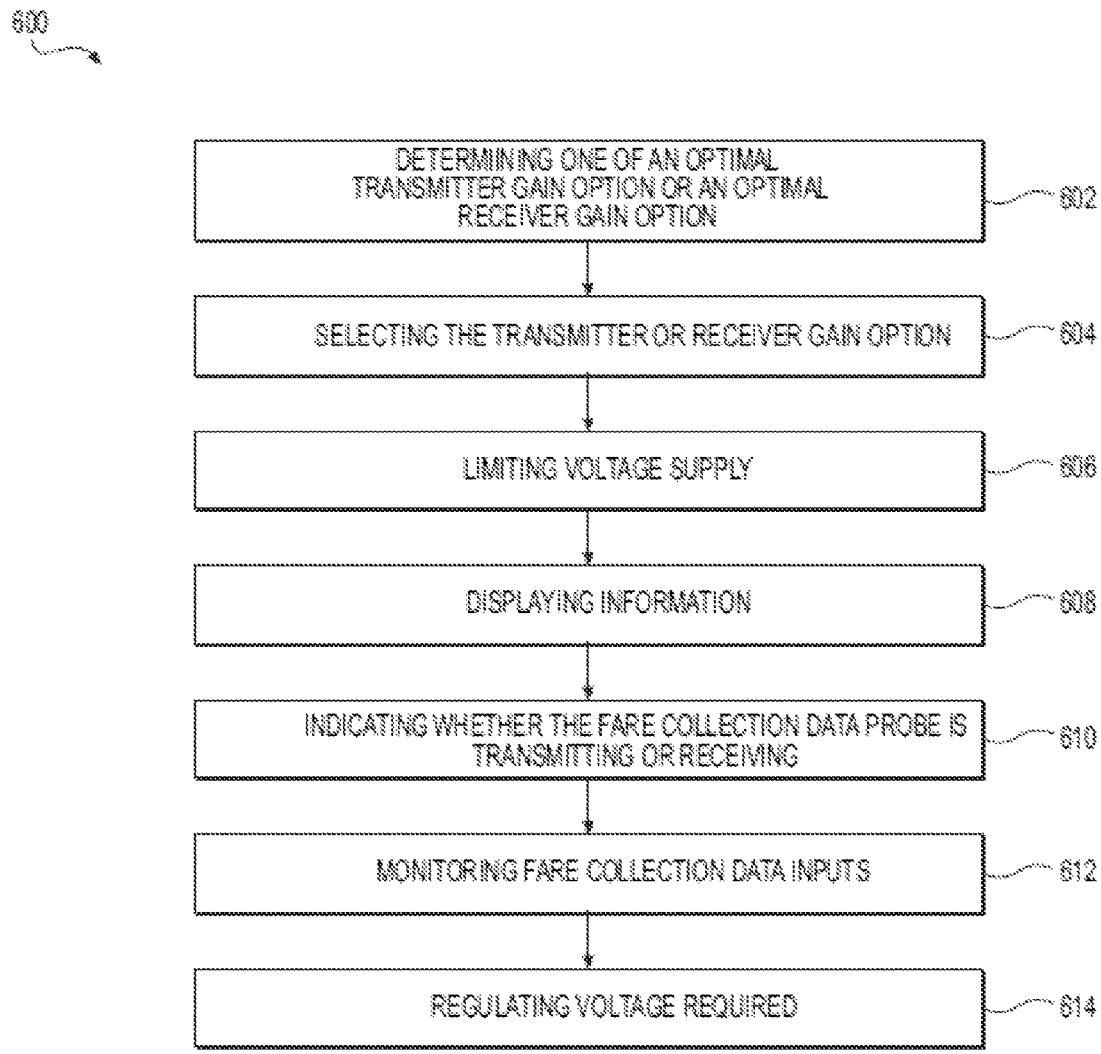
FIG. 6 shows the method for optimizing data transfer on the dynamic fare collection data probe according to one aspect of the disclosure.

FIG. 6 shows the method 600 for optimizing data transfer on the dynamic fare collection data probe. The first step is to determine 602 one of an optimal transmitter or receiver gain option. The processor 20 is responsible for making this determination. When the dynamic fare collection data probe 10 connects to a fare box 50 via a communication channel 2 as shown in FIG. 1, a hand shake process transfers data sequences across the communication channel 2. In the hand shake process, data rates and emitter and detector parameters associated with the fare collection system may vary. Therefore the processor 20 determines 602 based on the various parameters associated with the data transfer what the optimal receiver or transmitter gain option should be for the data transfer.

The next step is selecting 604 the transmitter or receiver gain option. As explained above, determining 602 a transmitter gain option 16 or receiver gain option 18 can be performed by selecting a resistor from a plurality of resistors or by pulse modulation. The selecting 604 of the transmitter or receiver gain option occurs based on the determination 602 of the optimal receiver or transmitter gain option.

During the process of optimizing data transfer on the dynamic fare collection data probe, the dynamic fare collection data probe may limit voltage supply 606. As explained above, this step can be performed using a low-dropout low-power linear voltage regulator or the like. The voltage protector 22 may be used in combination with a step-down switching regulator or the like to control power dissipation.

Also during the process, the dynamic fare collection data probe may display information 608 related to the transfer of data. The display 24 may display information such as the data transmission mode, system health, software status, rate of data transfer, and the like.

So that the user of the dynamic fare collection data probe is aware of the status of the device, the process of optimizing data transfer may include indicating 610 whether the dynamic fare collection data probe 10 is receiving or transmitting data. Indicating can be performed by using a light emitting diode or a plurality of light emitting diodes, a neon light, a filament lamp, or the like. The indicator 26 can be one color so that if on it represents a particular mode for the dynamic fare collection data probe 10, or may be multiple colors to represent each mode.

During the optimization of data transfer, the dynamic fare collection data probe may also monitor 612 input data, regulate voltage 614 for various system components, and execute diagnostic processes on the dynamic fare collection data probe 10. The processor 20 may work in combination with a voltage protector 22 to set voltages used on the dynamic fare collection data probe 10.

Figure 7:
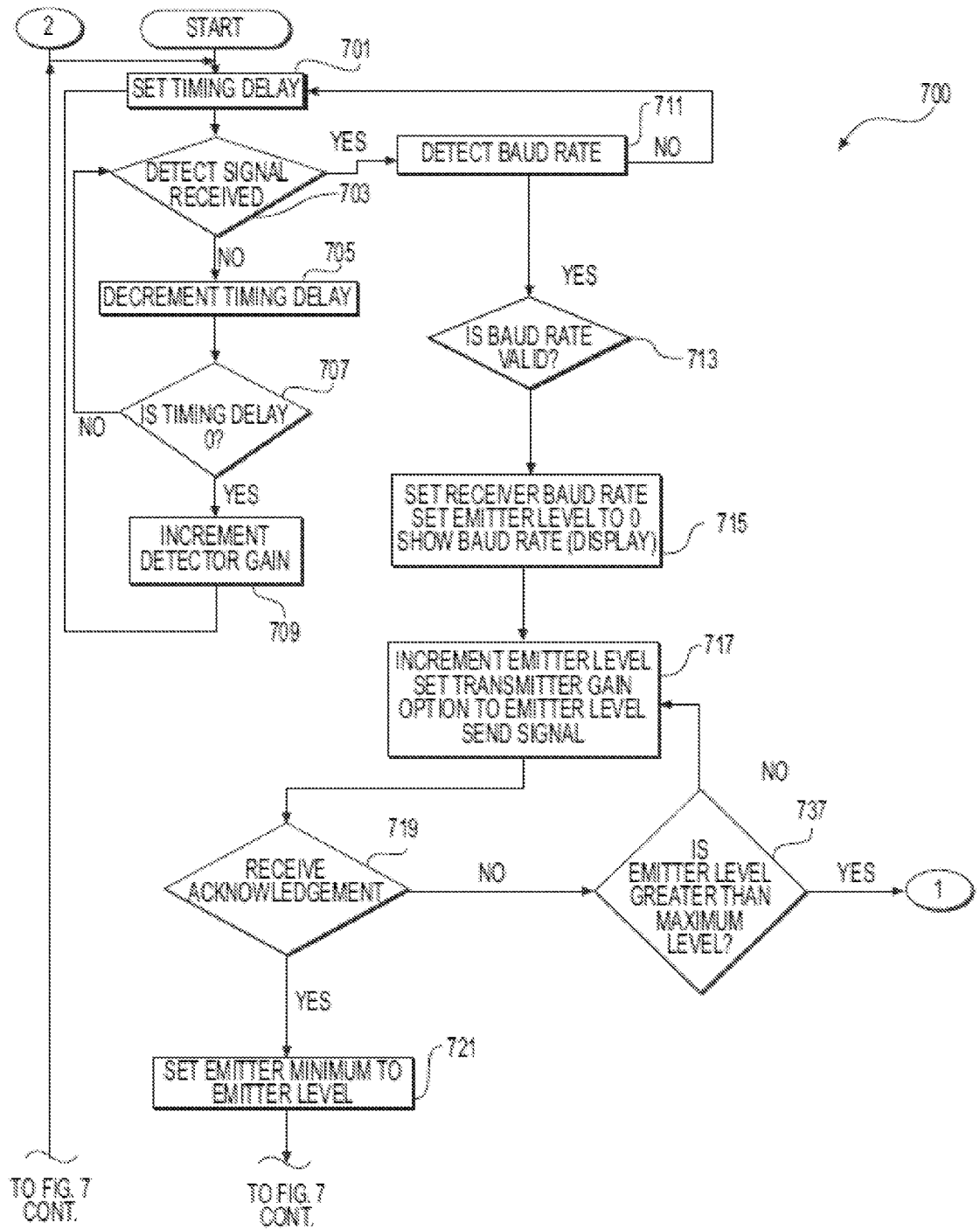
FIG. 7 shows a more detailed description of a process for optimizing data transfer on the dynamic fare collection data probe, according to one aspect of the disclosure.
Figure 7:
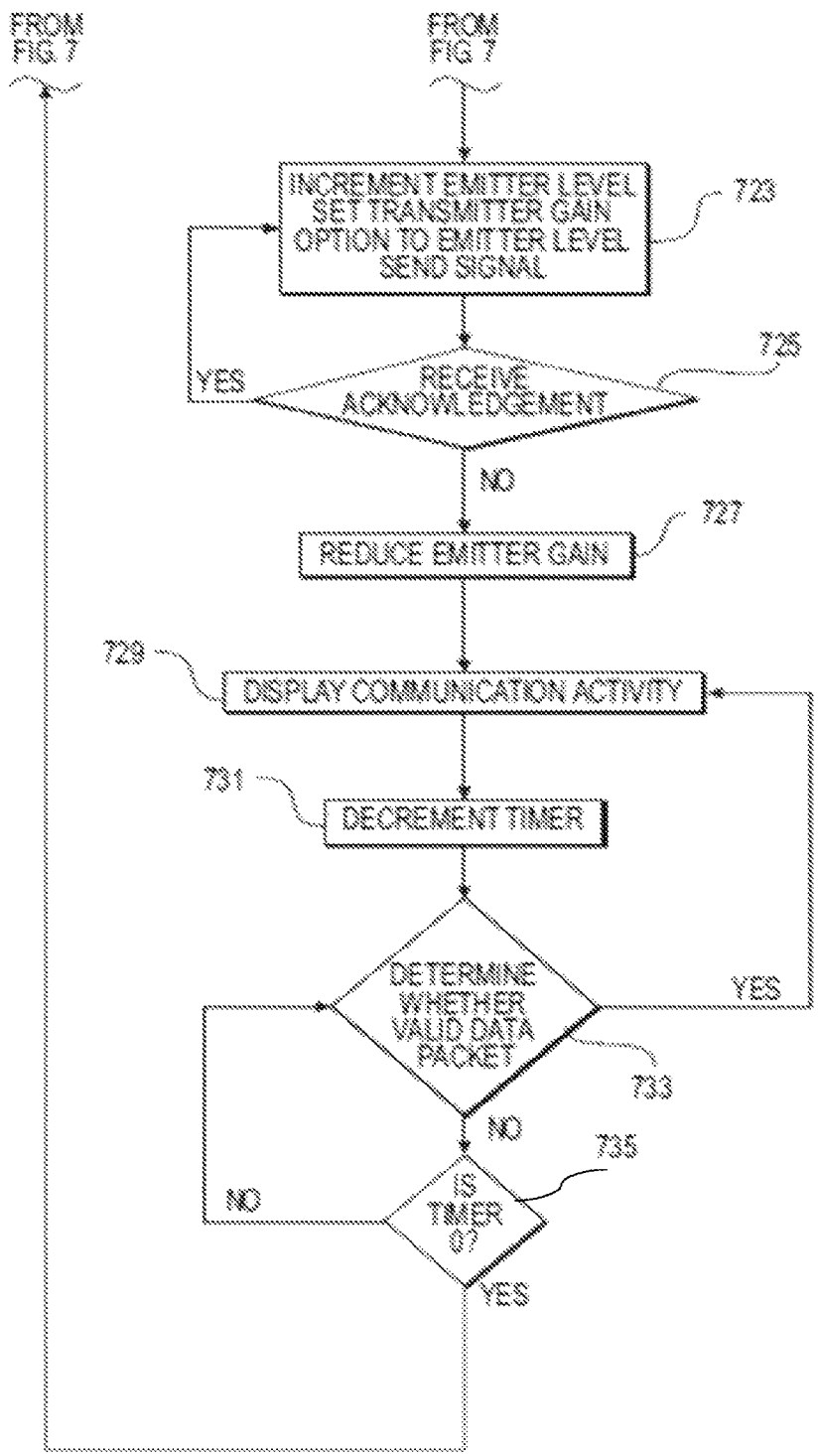
Figure 8:
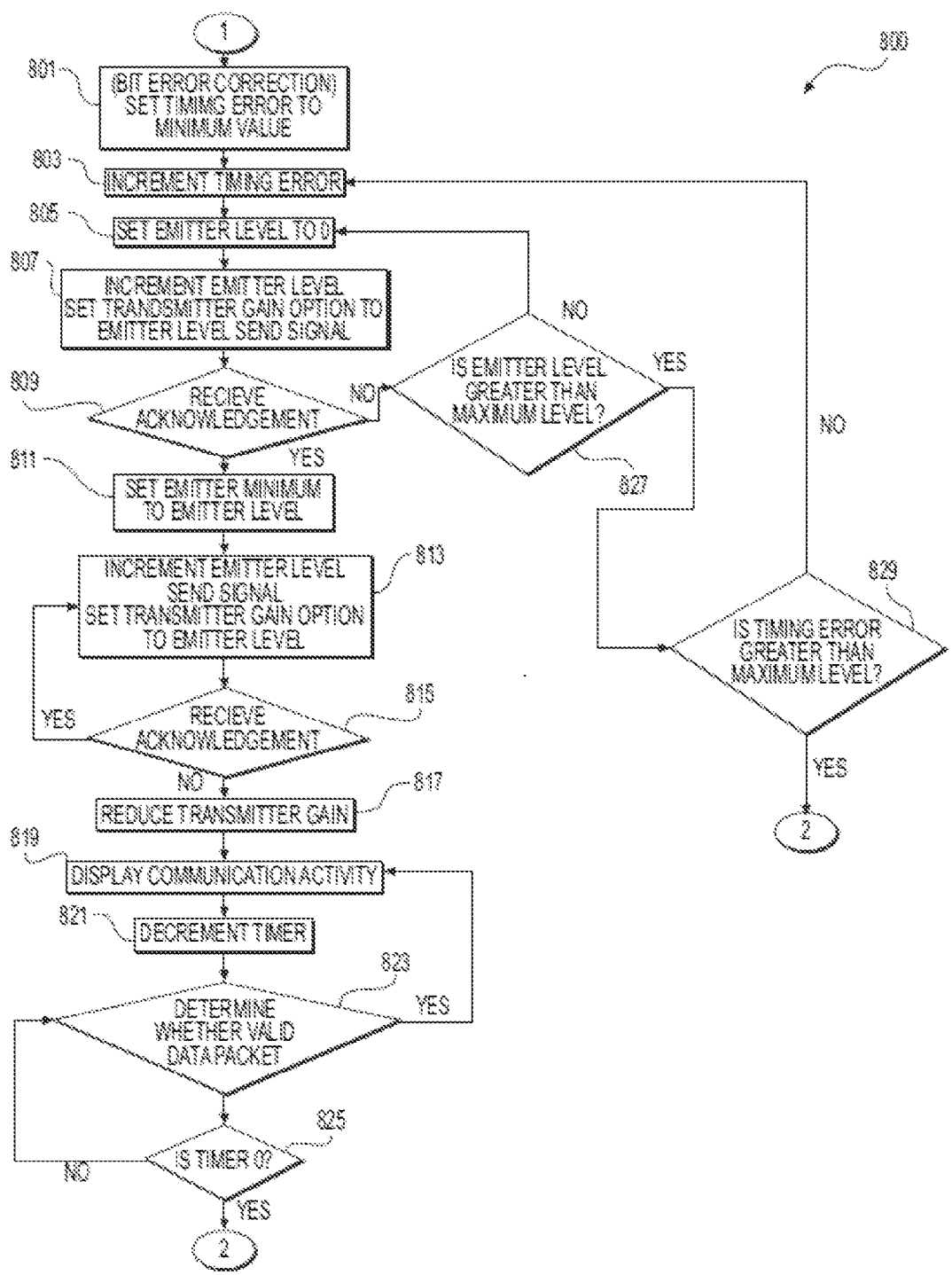
FIG. 8 shows a process of performing bit error correction, according to one aspect of the disclosure.

FIG. 7 shows a more detailed description of a process for optimizing data transfer on the dynamic fare collection data probe, according to one aspect of the disclosure; and FIG. 8 shows a process of performing bit error correction, according to one aspect of the disclosure. In FIG. 7, the process starts at 701 by setting a timing delay. The timing delay may be set long enough to allow for the dynamic fare collection data probe 10 to fully receive a data packet. The dynamic fare collection data probe 10 may move to step 703, where the processor 20 may determine whether a signal has been received. If a signal has been received at step 703, the process may move to step 711 to detect a baud rate. The processor 20 may determine at step 713 whether the baud rate is valid or not. If not, then the process may return to step 701 to set the timing delay.

If a signal is not detected at step 703, the process may continue to step 705 to decrement the timing delay. After decrementing the timing delay at step 705, the processor 20 may determine that the timing delay has reached zero at step 707. If the timing delay is not at zero, the process may return to step 703 to determine if a signal has been detected. If the timing delay at step 707 is zero, however, the receiver gain option 18 at 709 may be incremented before the process returns to step 701.

If the baud rate at step 713 is determined to be valid, the process may move to step 715. At step 715, a receiver 14 baud rate may be set, along with the transmitter 12 level being set to 0. In addition at step 713, the baud rate may be displayed. The process then may continue to step 717, where the transmitter gain option 16 may be incremented. In addition at step 717, the transmitter 12 level may be incremented, the transmitter gain option 16 may be set to the transmitter 12 level, and a signal may be sent.

The process at step 719 then may determine whether an acknowledgement has been received. If not, then step 721 may determine whether the transmitter 12 level is greater than a maximum level. If so, the process may move to node 1, discussed further in FIG. 8. If the transmitter 12 level has not reached a maximum level, however the process may return to step 717.

Once a data received acknowledgement has been received at step 719, the transmitter 12 level may be set to a minimum level at step 721. If a data received acknowledgement has not been received at step 719, however, the processor 20 may determine at step 737 whether the transmitter 12 level has exceeded its maximum level. If at step 737 the transmitter 12 has exceeded its maximum level, the process returns to node 1. Otherwise, the process returns to step 717 to increment the transmitter 12 level and set the transmitter gain option 16.

At step 723 the transmitter 12 level may be incremented, the transmitter gain option 16 may be set to the transmitter 12 level, and a signal may be sent. Once the signal has been sent at step 723, the process must determine whether a data received acknowledgement has been received at step 725.

If a data received acknowledgement has been received at step 725, the process may return to step 723 to continue to increase the transmitter gain 16 until an acknowledgement is no longer received at step 725. Once an acknowledgement is no longer received at step 725, transmitter gain 16 may be reduced at step 727. Steps 721, 723, and 725 may facilitate the process of increasing transmitter gain 16 until data is no longer received, at which point the transmitter gain option 16 may be reduced. At that point, communication activity may be displayed at step 729.

The timer may then be decremented at step 731. After decrementing the timer, step 733 may determine whether a transferred data packet is valid. If so, this result may be communicated at step 729 before decrementing the timer again at step 731. At step 735, the process may determine whether the timer has reached 0 yet. If not, the process may continue to determine whether the transferred data packet is valid at step 733 until the timer reaches 0 at step 735. Once the timer reaches 0 at step 735, the process may start over from node 2.

FIG. 8 shows a way of performing bit error correction. At step 801, a timing error may be set to a minimum value. At step 803, that timing error value may be incremented. Then at step 805, the transmitter 12 level may be set to zero. At step 807, the transmitter 12 level may be incremented and the transmitter gain 16 may be set to the transmitter 12 level. A signal may also be sent at step 805, which may include the timing error.

Once a signal is sent at step 805, the process at step 807 may determine whether an acknowledgement that data has been received. If not, the process may move to step 827 to determine whether the transmitter 12 level is greater than a maximum level. If not, then the transmitter 12 level at step 805 is set to zero. If so, the process may determine at step 829 whether the timing error is greater than a maximum level. If so, the process may return to node 2. If not, the process may return to step 803 to increment the timing error. Steps 807, 809, 827, and 829 may facilitate the process of incrementing the transmitter 12 level until data is no longer received, at which time the transmitter 12 level is set back to zero and, if the timing error is not greater than a maximum level, the timing error is incremented.

If a data received acknowledgment has been received at step 809, the transmitter 12 minimum level may be set to the transmitter 12 level at step 811. At step 813, the transmitter 12 level may be incremented and the transmitter gain 16 may be set to the transmitter 12 level. A signal may also be sent at step 813. Once the signal has been sent at step 813, the process determines at step 815 whether a data received acknowledgement has been received.

If so, the process may return to step 813 to increment the transmitter 12 level, set the transmitter gain option 16 to the transmitter 12 level, and to send a signal. Once step 815 recognizes that no data received acknowledgment has been received, the process may continue to step 817.

At step 817, transmitter gain 16 may be reduced. After reducing transmitter gain 16 at step 817, step 819 may display communication activity taking place. The timer may be decremented at step 821 until it reaches zero. If step 823 determines that a transferred data packet is valid, this may be displayed at step 819. If step 823 determines that a transferred data packet is not valid, however, the process may determine at step 825 whether the timer is at zero. If the timer is at zero at step 825, the process may return to node 2.

Figure 9:
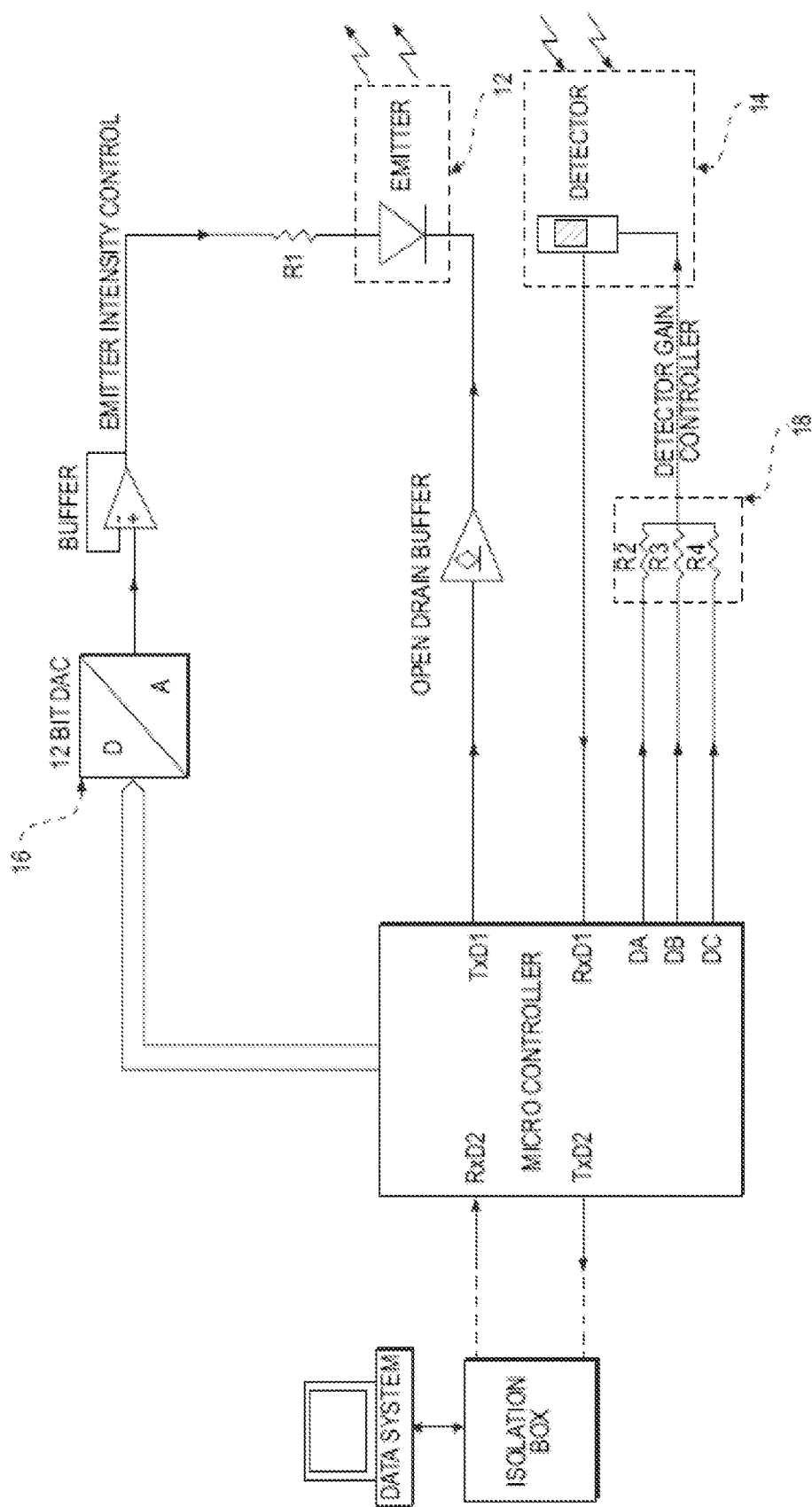
FIG. 9 shows an alternative schematic of the transmitter gain option and receiver gain option, according to one aspect of the disclosure.

FIG. 9 shows an alternative aspect of the transmitter gain option 16 and receiver gain option 18. In this aspect, a digital-to-analog converter may be used for the transmitter gain option 16 and may be coupled with an amplifier to provide a buffer for controlling the intensity of the transmitter 12. In addition, the receiver gain option 18 in this aspect may be a combination of resistors connected to the receiver 14. The transmitter gain option 16 and receiver gain option 18 may be determined by the processor 20.

Additionally, FIG. 9 depicts yet another aspect of the invention. The transmitter gain 16 may be a digital-to-analog converter as shown. The digital-to-analog converter may be arranged in combination with an amplifier to provide a buffer to control the intensity of transmitter 12. FIG. 9 also shows the receiver gain option 18 being a combination of resistors which may be selected for the receiver 14.

The invention may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

Further in accordance with various embodiments of the invention, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

While the device, system, and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A system for optimizing data transfer on a dynamic fare collection data probe, comprising:
   a transmitter configured to transmit data on the dynamic fare collection data probe;
   a receiver configured to receive data on the dynamic fare collection data probe;
   a transmitter gain option configured to control an intensity level of the transmitter;
   a receiver gain option configured to control an intensity level of the receiver;
   a processor configured to select the transmitter gain option and receiver gain option; and
   a voltage protector configured to limit voltage supply to the dynamic fare collection data probe.

2. The system of claim 1, further comprising a display configured to display information related to the transfer of fare collection data on the dynamic fare collection data probe.

3. The system of claim 1, further comprising an indicator configured to indicate, in response to transmitting data from the dynamic fare collection data probe and receiving data on the dynamic fare collection data probe, whether the dynamic fare collection data probe is transmitting or receiving fare collection data.

4. The system of claim 1, wherein the selection of the transmitter gain option comprises selecting a first resistor from among a first plurality of resistors, and wherein the selection of the receiver gain option comprises selecting a second resistor from among a second plurality of resistors.

5. The system of claim 1, wherein the transmitter is an infrared emitter and wherein the receiver is an infrared detector.

6. The system of claim 1, wherein the processor is further configured to set the transmitter gain option to the transmitter intensity level.

7. The system of claim 1 further configured to set the receiver gain option to the receiver intensity level.

8. The system of claim 1, wherein the voltage protector is configured to decouple the dynamic fare collection data probe from a coupled device.

9. A system for optimizing data transfer on a dynamic fare collection data probe, comprising:
   a transmitter configured to transmit data on the dynamic fare collection data probe;
   a receiver configured to receive data on the dynamic fare collection data probe;
   a transmitter gain option configured to control an intensity level of the transmitter;
   a receiver gain option configured to control an intensity level of the receiver;
   a processor configured to select the transmitter gain option and receiver gain option; and
   a diagnostic monitor configured to monitor fare collection data inputs and regulate voltage required for a diagnostic decision.

10. A method for optimizing data transfer on a dynamic fare collection data probe, comprising:
    determining at least one of the following: an optimal transmitter gain option and an optimal receiver gain option;
    selecting, upon determining at least one of the optimal transmitter gain option and the optimal receiver gain option, at least one of the optimal receiver gain option and the optimal transmitter gain option;
    transmitting data from the dynamic fare collection data probe with an infrared emitter, wherein transmitting data from the dynamic fare collection data probe comprises using the selected optimal transmitter gain option to control the transmission of data;
    receiving data on the dynamic fare collection data probe with an infrared detector, wherein receiving data on the dynamic fare collection data probe comprises using the selected optimal receiver gain option to control the reception of data; and monitoring fare collection data inputs on the dynamic fare collection data probe in response to transmitting data from the dynamic fare collection data probe and receiving data on the dynamic fare collection data probe.

11. The method of claim 10, further comprising limiting voltage supply to the dynamic fare collection data probe.

12. The method of claim 10, further comprising displaying information related to the transfer of fare collection data on the dynamic fare collection data probe.

13. The method of claim 10, further comprising indicating, in response to transmitting data from the dynamic fare collection data probe and receiving data on the dynamic fare collection data probe, whether the dynamic fare collection data probe is transmitting or receiving fare collection data.

14. The method of claim 10, further comprising regulating voltage required for a diagnostic decision on the dynamic fare collection data probe.

15. The method of claim 10, wherein selecting one of the transmitter gain option or the receiver gain option comprises selecting a resistor from among a plurality of resistors.

16. The method of claim 10, wherein selecting one of the transmitter gain option or the receiver gain option comprises varying voltage for pulse modulation.

* * * * *